(12) United States Patent
Shimizu et al.

(10) Patent No.: US 8,477,478 B2
(45) Date of Patent: Jul. 2, 2013

(54) CAPACITOR

(75) Inventors: Toshiaki Shimizu, Nara (JP); Ichiro Aoki, Osaka (JP); Takumi Yamaguchi, Kyoto (JP); Kouji Ueoka, Nara (JP); Yuta Amiuchi, Hyogo (JP)

(73) Assignee: Panasonic Corporation, Osaka (JP)

( * ) Notice: Subject to any disclaimer, the term of this patent is extended or adjusted under 35 U.S.C. 154(b) by 82 days.

(21) Appl. No.: 13/259,225

(22) PCT Filed: May 14, 2009

(86) PCT No.: PCT/JP2009/002103
§ 371 (c)(1),
(2), (4) Date: Sep. 23, 2011

(87) PCT Pub. No.: WO2010/131295
PCT Pub. Date: Nov. 18, 2010

(65) Prior Publication Data
US 2012/0019984 A1 Jan. 26, 2012

(51) Int. Cl.
*H01G 9/155* (2006.01)
(52) U.S. Cl.
USPC .............................. 361/502; 361/519; 361/537
(58) Field of Classification Search
USPC ................. 361/517–520, 537–539, 502
See application file for complete search history.

(56) References Cited

U.S. PATENT DOCUMENTS

| 6,603,653 B2 * | 8/2003 | Matsuoka et al. | 361/502 |
| 7,016,178 B2 * | 3/2006 | Erhardt et al. | 361/517 |
| 7,495,889 B2 * | 2/2009 | Will | 361/517 |
| 7,817,404 B2 * | 10/2010 | Miura et al. | 361/518 |
| 7,916,454 B2 * | 3/2011 | Shimizu et al. | 361/521 |
| 8,045,320 B2 * | 10/2011 | Hibi et al. | 361/502 |
| 8,164,882 B2 * | 4/2012 | Sakata et al. | 361/519 |
| 2009/0122468 A1 | 5/2009 | Miura et al. | |
| 2010/0149727 A1 * | 6/2010 | Miura et al. | 361/518 |
| 2010/0149728 A1 * | 6/2010 | Shimizu et al. | 361/519 |

FOREIGN PATENT DOCUMENTS

| JP | 08-138727 | 5/1996 |
| JP | 2007-189184 | 7/2007 |
| JP | 2008-098545 | 4/2008 |
| WO | WO 2008047597 A1 * | 4/2008 |

OTHER PUBLICATIONS

International Search Report of PCT Application No. PCT/JP2009/002103, dated Jul. 14, 2009.

* cited by examiner

*Primary Examiner* — Eric Thomas
(74) *Attorney, Agent, or Firm* — Panasonic Patent Center

(57) ABSTRACT

A capacitor has a capacitor element, an electrolyte, a cylindrical case made of metal and having a bottom, a metal terminal plate, and a sealing rubber. The terminal plate has a body portion and a flange portion projected from an outer peripheral surface of the body portion toward the case. The sealing rubber is abutted onto the flange portion of the terminal plate, and is interposed between the outer peripheral surface of the body portion of the terminal plate and a side surface of the case for sealing the case. The case has a drawn and grooved portion formed by being drawn and thus grooved from an outside of the side surface at a place so that the sealing rubber is compressed between the outer peripheral surface of the body portion of the terminal plate and the case. Then, a ring-like groove is provided on the outer peripheral surface of the body portion of the terminal plate at a portion, which is padded with the sealing rubber, the sealing rubber is projected into the groove.

5 Claims, 5 Drawing Sheets

CAPACITOR

TECHNICAL FIELD

The present invention relates to a capacitor used in various electronic equipment, automobiles and the like. More specifically, the present invention relates to a sealing configuration of a capacitor using an electrolyte.

BACKGROUND ART

FIG. 8 is a partial cross-sectional view showing a configuration of a sealing portion of a conventional electric double layer capacitor. The capacitor has a substantially cylindrical capacitor element (not shown), cylindrical case 11, which is made of metal, has a bottom, and accommodates the capacitor element, terminal plate 12, and sealing rubber 13.

One electrode of the capacitor element is connected to terminal plate 12. The other electrode thereof is connected to a bottom surface of case 11. That is, case 11 functions as one of terminals.

Flange portion 12D is provided horizontally along a peripheral edge at a lower end of an outer peripheral surface of terminal plate 12. Ring-shaped sealing rubber 13 made of an insulating rubber is fitted onto the outer peripheral surface of terminal plate 12 so as to be abutted and positioned onto flange portion 12D. Then, sealing rubber 13 is compressed between drawn and grooved portion 11A provided to a side surface of case 11 and the outer peripheral surface of terminal plate 12 from an outside of the side surface of case 11. Thereby, an opening of case 11 is sealed to secure airtightness, and case 11 is insulated from terminal plate 12.

Further, sealing rubber 13 is pressingly contacted and held onto case 11 by curled portion 11C of arc cross section, formed by processing an end of the opening of case 11 so as to curl it toward an inside diameter of case 11 (typically, called curling processing).

In this way, the capacitor can increase an area of an outer peripheral surface of sealing rubber 13 which is compressed by groove-processing with respect to the outer peripheral surface of case 11, and the amount of compression thereof. Therefore, improvement of airtightness can be enhanced to improve reliability. In addition, a shape of sealing rubber 13 can be simplified to make manufacturing easy (for instance, PTL 1).

In the above configuration, sealing rubber 13 is compressed between the outer peripheral surface of terminal plate 12 and drawn and grooved portion 11A provided onto the side surface of case 11 to hold a sealed state. However, when there is a slight flaw or dent on the outer peripheral surface of terminal plate 12, an electrolyte can leak from the flaw. Such flaw and dent can be caused when a stamping mold for manufacturing terminal plate 12 is damaged or a large number of terminal plates 12 are conveyed together. Therefore, the above sealing configuration is required to further enhance reliability against the leakage of electrolyte.

Citation List

Patent Literature

PTL 1: Unexamined Japanese Patent Publication No. 2007-189184

SUMMARY OF THE INVENTION

A capacitor of the present invention has a capacitor element, an electrolyte, a cylindrical case made of metal and having a bottom, a metal terminal plate, and a sealing rubber. The capacitor element includes a first electrode, a second electrode, and a separator interposed therebetween to prevent contact of the first electrode with the second electrode. The electrolyte is impregnated in the capacitor element. The case accommodates the capacitor element and the electrolyte, and is connected to the first electrode. The terminal plate has a body portion, and a flange portion projected from an outer peripheral surface of the body portion toward the case. The terminal plate is connected to the second electrode. The sealing rubber is abutted onto the flange portion of the terminal plate, and is interposed between the outer peripheral surface of the body portion of the terminal plate and a side surface of the case to seal the case. The case has a drawn and grooved portion formed by being drawn and thus grooved from an outside of the side surface at a place, thereby the sealing rubber is compressed between the outer peripheral surface of the body portion of the terminal plate and the case. A ring-shaped groove is provided on the outer peripheral surface of the body portion of the terminal plate at a portion, which is padded with the sealing rubber, the sealing rubber being projected into the groove.

With this configuration, even when there is a flaw or dent on the outer peripheral surface of the terminal plate, the sealing rubber is compressed on a surface in the groove without a flaw or dent to enable a sealed state of the case to be held reliably. Therefore, reliability of the capacitor using the electrolyte, against the leakage electrolyte, can be enhanced.

DETAILED DESCRIPTION OF PREFERRED EMBODIMENTS

Hereinafter, an embodiment of the present invention will be described with reference to the drawings. In the following description, a capacitor according to the present invention will be described by taking an electric double layer capacitor as an example, but the present invention is applicable to other cylindrical capacitors using an electrolyte like an electrolytic capacitor. It is to be noted that the present invention is not limited to the embodiment.

Embodiment

Figure 1:
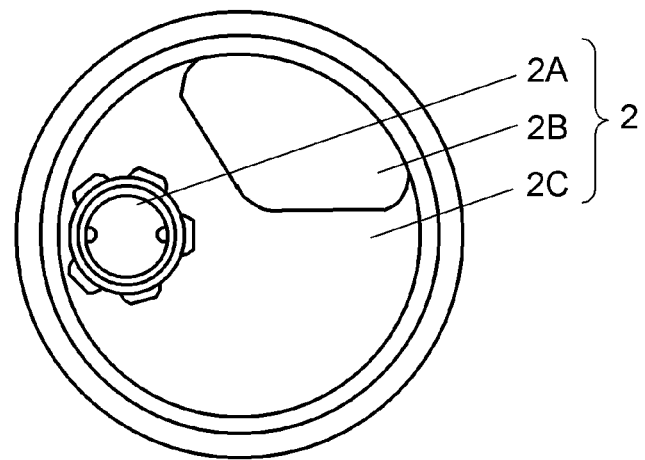
FIG. 1 is a top view showing an appearance of an electric double layer capacitor according to an embodiment of the present invention.
Figure 2:
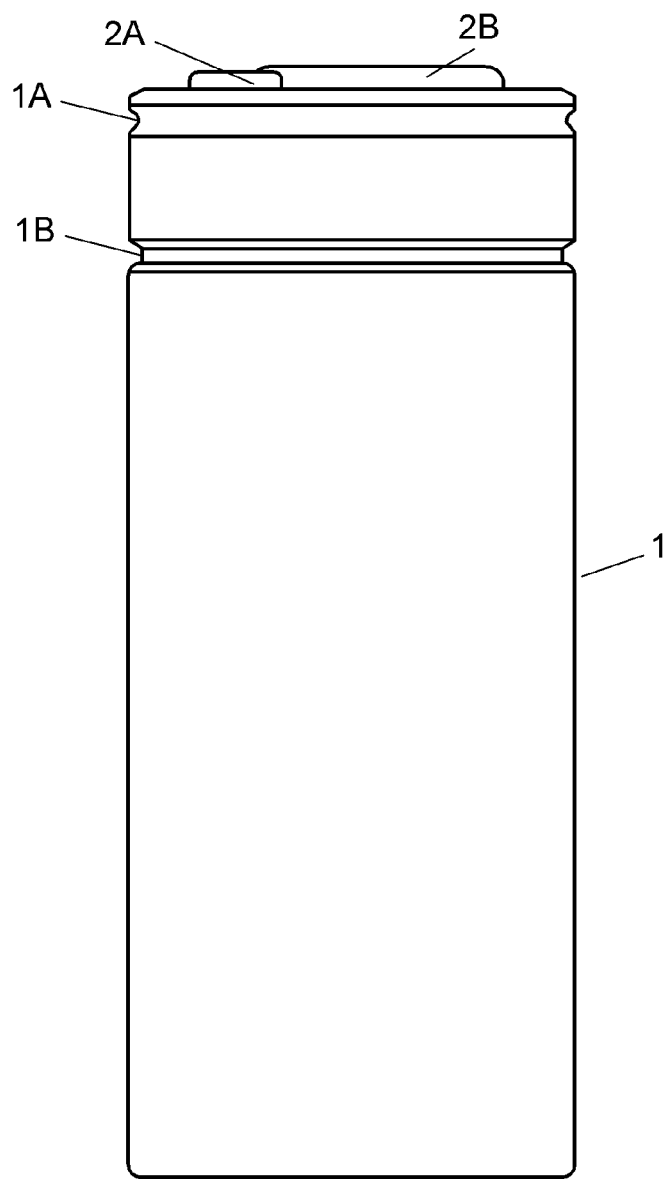
FIG. 2 is a front view of the electric double layer capacitor shown in FIG. 1.
Figure 3:
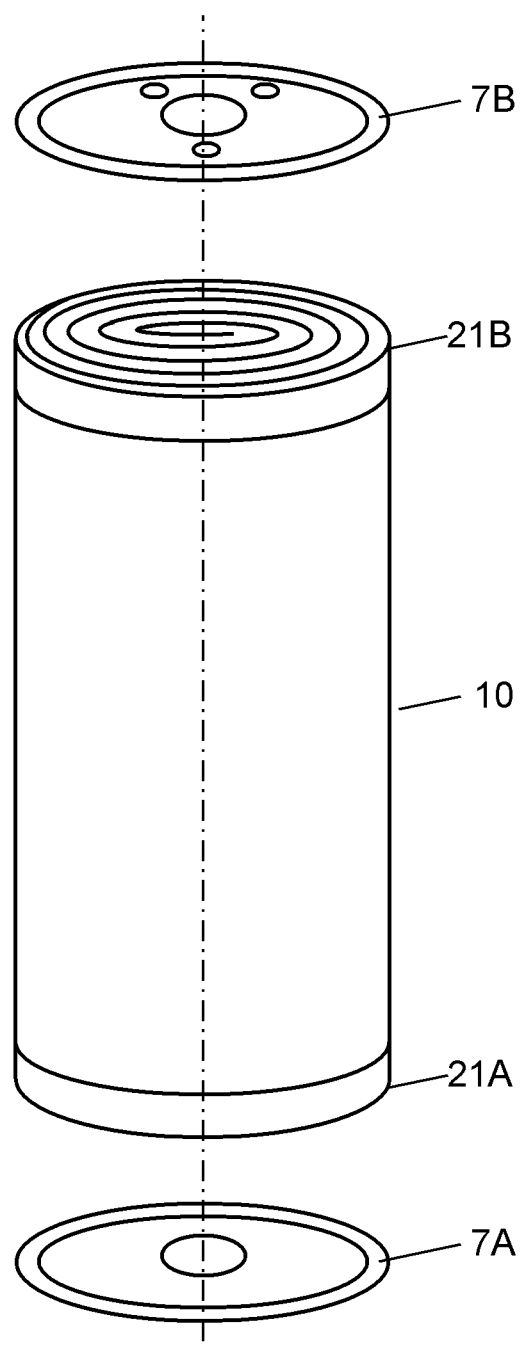
FIG. 3 is an exploded perspective view of a capacitor element of the electric double layer capacitor shown in FIG. 1.
Figure 4:
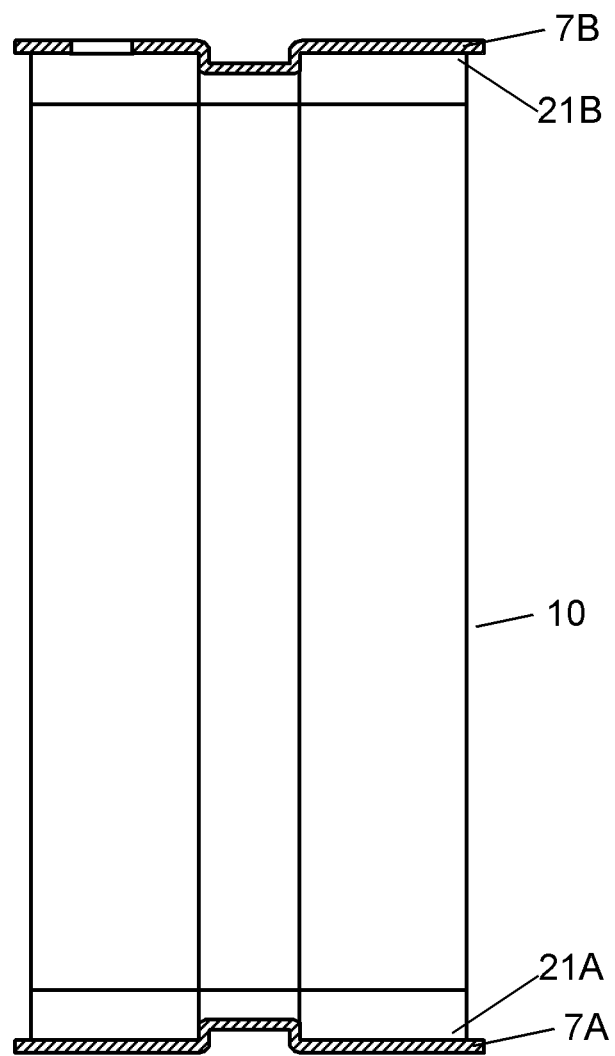
FIG. 4 is a schematic cross-sectional view showing the capacitor element shown in FIG. 3.
Figure 5:
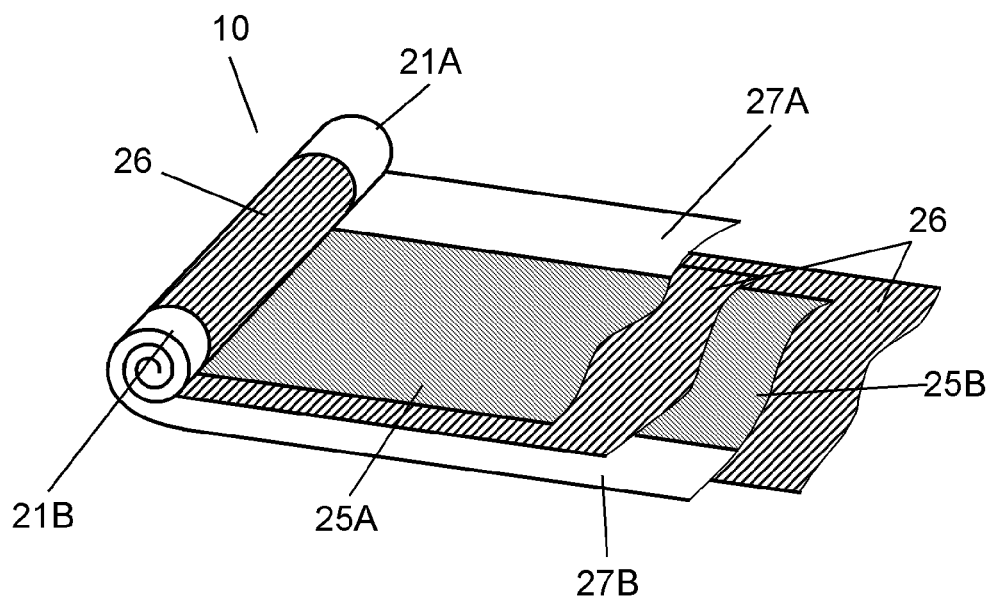
FIG. 5 is a developed view of the capacitor element shown in FIG. 3.
Figure 6:
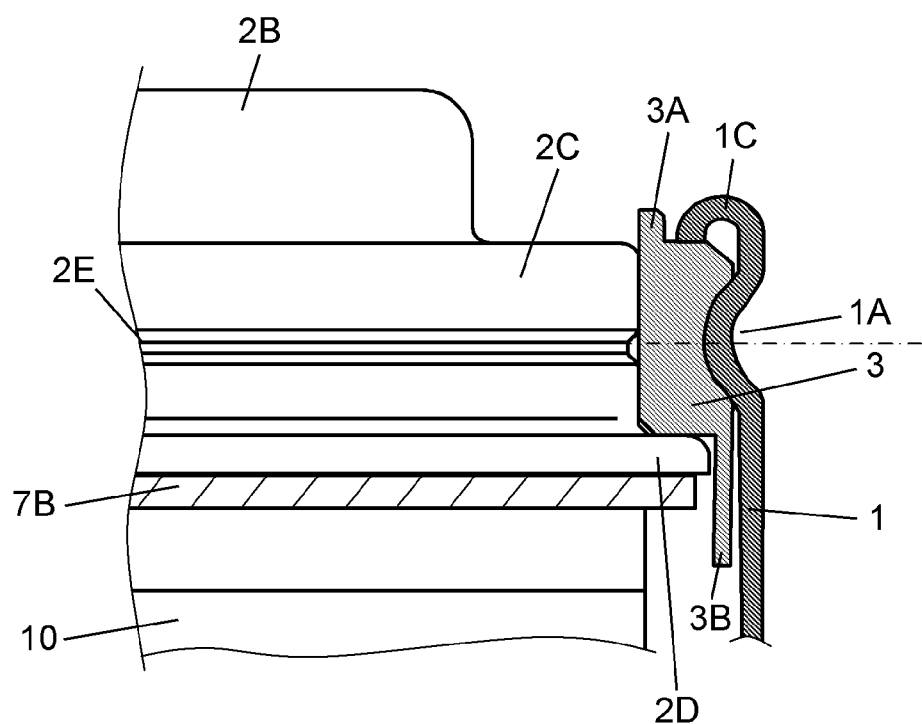
FIG. 6 is a partial cross-sectional view of a sealing portion of the electric double layer capacitor shown in FIG. 1.
Figure 7:
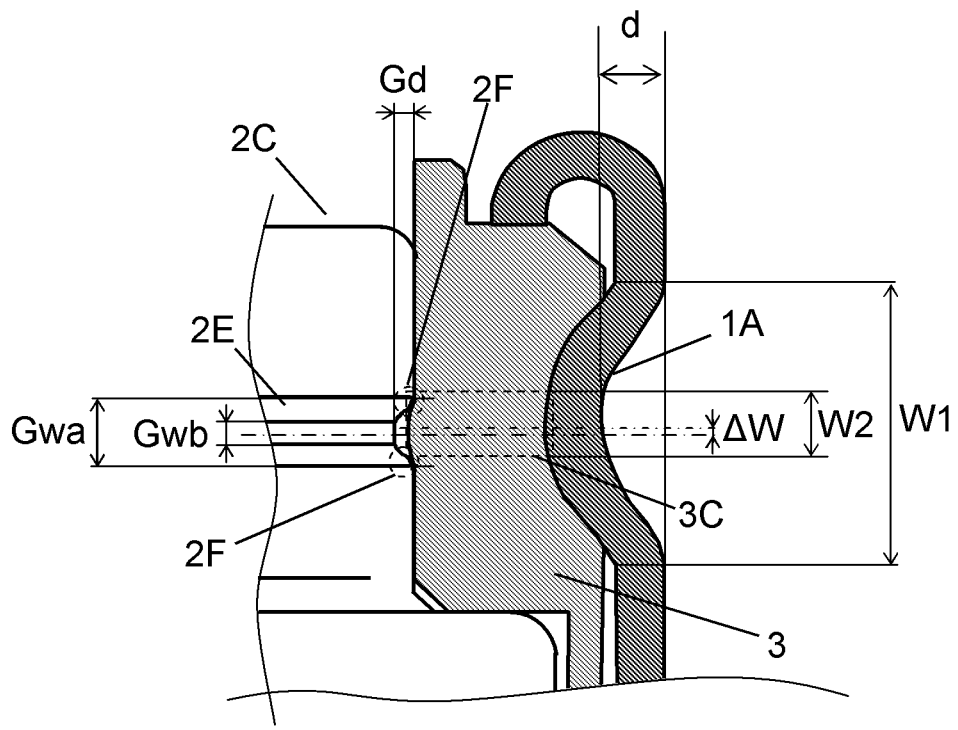
FIG. 7 is an enlarged view of FIG. 6.
Figure 8:
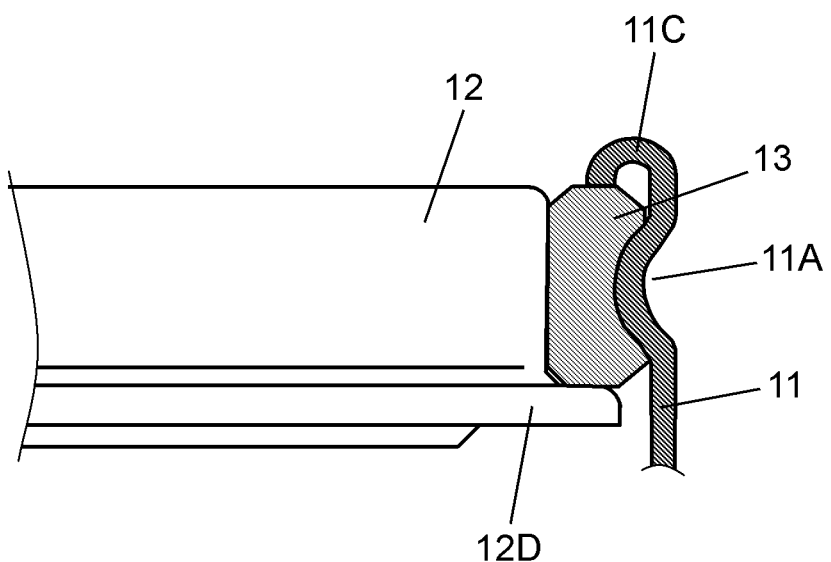
FIG. 8 is a partial cross-sectional view of a sealing portion of a conventional capacitor.

FIGS. 1 and 2 are a top view and a front view showing an appearance of an electric double layer capacitor according to an embodiment of the present invention, respectively. FIGS. 3, 4, and 5 are an exploded perspective view, a schematic cross-sectional view, and a developed view showing a capacitor element of the electric double layer capacitor according to the embodiment of the present invention, respectively. FIG. 6 is a partial cross-sectional view of a sealing portion of the electric double layer capacitor according to the embodiment of the present invention, and FIG. 7 is an enlarged view thereof. The capacitor has capacitor element 10, an electrolyte (not shown) impregnated in the capacitor element, cylindrical case 1 made of metal and having a bottom, metal terminal plate 2, and sealing rubber 3.

As shown in FIG. 5, capacitor element 10 includes first electrode, second electrode, and separator 26 interposed therebetween. First electrode includes current collector 27A, and polarizable electrode layers 25A formed on both sides thereof. Second electrode includes current collector 27B, and polarizable electrode layers 25B formed on both sides thereof. Separator 26 prevents the first electrode from contacting with the second electrode. Capacitor element 10 is formed by winding first electrode, second electrode, and separator 26 in their long direction.

As shown in FIG. 5, portions in which current collectors 27A and 27B are exposed without forming polarizable electrode layers 25A and 25B (current collector-exposed portions) are provided on one side along the long direction of first electrode and second electrode, respectively. Then, first electrode and second electrode are arranged so that the current collector-exposed portions are opposite each other after winding. In addition, a width of separator 26 is set so that ends of the current collector-exposed portions are exposed from separator 26. In this way, ends 21A and 21B in which current collectors 27A and 27B are exposed are formed at both ends of capacitor element 10, respectively.

As shown in FIGS. 3 and 4, current collecting plates 7A and 7B made of metal and having a disc shape are joined to ends 21A and 21B by laser welding, respectively.

As shown in FIG. 1, terminal plate 2 made of metal such as aluminum has body portion 2C, and pressure regulating valve 2A and terminal portion 2B on an upper surface of body portion 2C. Pressure regulating valve 2A regulates a pressure in case 1. That is, when the pressure in case 1 becomes larger than a predetermined value, pressure regulating valve 2A is opened to release the internal gas. Thereby, the increased internal pressure is lowered.

Terminal portion 2B which can be electrically led to external equipment is formed with a plane higher than an upper end of case 1. Thereby, a connection bar or the like can be attached to terminal portion 2B, if necessary. It is to be noted that although only one terminal portion 2B is provided in FIG. 1, a plurality of terminal portions 2B may be provided.

As shown in FIG. 6, terminal plate 2 further has flange portion 2D provided horizontally along a peripheral edge at a lower end of body portion 2C. Flange portion 2D is joined to current colleting plate 7B joined to end 21B of capacitor element 10 accommodated in case 1 by laser welding. On the other hand, current collecting plate 7A is joined to an inner bottom surface of case 1 by laser welding or the like.

As described above, case 1 accommodates capacitor element 10 and the electrolyte, and is electrically connected to first electrode. On the other hand, terminal plate 2 is electrically connected to second electrode. In addition, an outer peripheral surface of case 1 is provided with drawn and grooved portion 1A for sealing and drawn and grooved portion 1B for positioning of capacitor element 10.

Next, the sealing portion which is a feature of the present invention will be described mainly with reference to FIGS. 6 and 7. It is to be noted that in order to ease an understanding thereof, in these drawings, only case 1 and sealing rubber 3 are shown in a cross-sectional view, and terminal plate 2 is shown in a front view.

Ring-shaped sealing rubber 3 is formed of an insulating rubber such as butyl rubber (isobutylene-isoprene rubber). Sealing rubber 3 is fitted onto an outer peripheral surface of terminal plate 2 so as to be contacted with and positioned onto flange portion 2D of terminal plate 2. After current collecting plate 7B is joined to flange portion 2D, sealing rubber 3 is fitted onto the outer peripheral surface of terminal plate 2.

In this state, capacitor element 10 is accommodated in case 1 together with terminal plate 2 and sealing rubber 3. Then, as shown in FIG. 2, a side surface of case 1 is subjected to drawing processing to form drawn and grooved portion 1B. Further, current collecting plate 7A is joined to the inner bottom surface of case 1. Thereafter, the electrolyte is injected from a hole (not shown) for attaching pressure regulating valve 2A, and the side surface of case 1 is subjected to drawing processing to form drawn and grooved portion 1A. As a result, flange portion 2D is projected from the outer peripheral surface of body portion 2C of terminal plate 2 toward case 1.

Sealing rubber 3 is compressed between the outer peripheral surface of body portion 2C of terminal plate 2 and the side surface of case 1 from an outside of the side surface of case 1 by drawn and grooved portion 1A provided on the side surface of case 1. Thereby, an opening of case 1 is sealed to secure airtightness. In this way, the airtightness between sealing rubber 3 and the outer peripheral portion of terminal plate 2 can be enhanced by drawing of drawn and grooved portion 1A from the outside of case 1. Therefore, the electrolyte in case 1 can be prevented from leaking. In addition, since terminal plate 2 cannot be contacted with metal case 1 due to a wall thickness of sealing rubber 3, case 1 can be insulated from terminal plate 2 by sealing rubber 3 without using an insulating ring.

Further, it is preferable that an end of the opening of case 1 is processed so as to be curled toward an inside diameter of case 1 (typically, called curling processing) to form curled portion 1C of arc in cross section. Since curled portion 1C pressingly contacts and holds sealing rubber 3 inward of case 1, the airtightness can be further enhanced.

In addition, it is preferable that an upper surface of sealing rubber 3 is formed with upper projected wall 3A which is projected between terminal plate 2 and curled portion 1C. Upper projected wall 3A is provided along the entire periphery of the upper surface of sealing rubber 3, that is, in a ring shape.

When moisture adheres onto terminal plate 2, curled portion 1C and terminal plate 2, which are connected to positive and negative electrodes, respectively, can be short-circuited. In such a case, upper projected wall 3A serves as an insulating barrier and can prevent a short circuit between case 1 and terminal plate 2, thereby enabling safety to be enhanced in abnormal use.

In addition, it is preferable that a lower surface of sealing rubber 3 is formed with lower projected wall 3B which is projected between case 1 and flange portion 2D of terminal plate 2 with current collecting plate 7B. Lower projected wall 3B is also provided along the entire periphery of the lower surface of sealing rubber 3, that is, in a ring shape.

When case 1 is subjected to a forcible pressure from a lateral direction of case 1 so as to be deformed abnormally, flange portion 2D provided for positioning sealing rubber 3 with current collecting plate 7B joined thereto and case 1 can be short-circuited. In such a case, lower projected wall 3B serves as an insulating barrier and can prevent a short circuit between case 1 and terminal plate 2, thereby enabling safety to be enhanced in abnormal use.

Furthermore, ring-shaped groove 2E is provided on the outer peripheral surface of body portion 2C of terminal plate 2, onto which sealing rubber 3 is padded. As shown in FIG. 7, sealing rubber 3 is projected into groove 2E. A portion of sealing rubber 3, which is projected into groove 2E, is pressed onto a wall surface in groove 2E. Therefore, even when there is a flaw or a dent in the outer peripheral surface of body portion 2C, sealing rubber 3 closes a leak path of the electrolyte between the wall surface in groove 2E in which a flaw or a dent is not typically caused, and drawn and grooved portion 1A of case 1. That is, sealing rubber 3 is compressed on the surface in groove 2E without any flaw and dent so that a sealed state of case 1 can be held reliably. Therefore, reliability of the capacitor using the electrolyte, against the leak of the electrolyte, can be enhanced.

Next, preferred dimension design of groove 2E, drawn and grooved portion 1A, and sealing rubber 3 will be described.

First, it is preferable that width Gwa of groove 2E is smaller than width W1 of drawn and grooved portion 1A which is a portion of case 1 and subjected to drawing processing. Since sealing rubber 3 can be reliably pressed onto the entire width direction of groove 2E due to the dimension, the sealed state of case 1 can be held reliably.

In addition, it is preferable that a centerline in the width direction of groove 2E is shifted from a centerline in a width direction of drawn and grooved portion 1A. Although sealing rubber 3 is compressed to form sealing reactive force portion 3C, in this configuration, sealing reactive force portion 3C is pressed onto one of upper and lower boundary portions 2F between groove 2E and the outer peripheral surface of body portion 2C. Therefore, sealing rubber 3 is reliably pressed onto a surface of one of boundary portions 2F, so that the sealed state of case 1 can be held more reliably.

It is more preferable that extension of the centerline of drawn and grooved portion 1A is within a range of the width of groove 2E. A shifted dimension of the centerline is limited in this manner so that sealing rubber 3 can be reliably pressed onto the surface of one of boundary portions 2F more reliably.

Meanwhile, hardness and compression permanent deformation are reduced gradually due to deterioration over time in a raw material of sealing rubber 3, and become about half an initial value after an elapse of ten years under ordinary temperature and humidity conditions. In particular, even after an elapse of ten years, as an automobile component, the capacitor is required not to leak the electrolyte.

To meet this request, it is preferable that width W1 of drawn and grooved portion 1A is set so that sealing reactive force portion 3C is pressed onto one of boundary portions 2F even after the hardness and compression permanent deformation of sealing rubber 3 are deteriorated.

Furthermore, it is preferable that each boundary portion 2F has a curved surface projected into groove 2E. Sealing rubber 3 is pressed onto boundary portion 2F to substantially hold the sealed state of the capacitor. Therefore, since this portion is formed to be curved, sealing rubber 3 exerts a compressive stress more reliably, and no significant stress so as to break sealing rubber 3 is exerted.

In addition, even when a large flaw (groove) is caused so as to cross groove 2E, it is preferable that sealing rubber 3 is pressed onto the surface of boundary portion 2F in a position deeper than a range of the flaw. That is, it is preferable that a depth of groove 2E is a depth to the extent that sealing rubber 3 is pressed onto the surface of boundary portion 2F in the position deeper than a depth of a flaw in a direction crossing groove 2E. Since, a depth of a flaw and a dent is actually 50 μm or less, pit is preferable that a sealing portion formed of sealing rubber 3 and boundary portion 2F is formed in a position deeper than 50 μm.

An example of dimensions satisfying the above conditions will be described. Herein, body portion 2C has an outer diameter of 26.7 mm, and case 1 has an outer diameter of 35 mm and a thickness of 0.7 mm. Sealing rubber 3 has an outer diameter of 33.4 mm, and an inner diameter of 26.7 mm. Sealing rubber 3 is made of butyl rubber (a hardness of 90 according to the IRHD standards). At this time, drawn and grooved portion 1A has width W1 of 3 mm and groove depth d of 0.6 mm, sealing reactive force portion 3C has width W2 of 1.9 mm, and groove 2E has width Gwa of 2 mm and width Gwb in the deepest position of 1 mm. Groove 2E has depth Gd of 0.5 mm, and shift $\Delta W$ between the centerline in the width direction of groove 2E and the centerline in the width direction of drawn and grooved portion 1A is 0.3 mm. In addition, a shape of boundary portion 2F is R0.5. Although a preferred size of R is different according to a height of sealing rubber 3 and terminal plate 2, it ranges preferably from R0.05 to R2.

In addition, it is preferable that width W1 of drawn and grooved portion 1A is from 1.2 times to 1.6 times of width Gwa of groove 2E. When width W1 is less than 1.2 times of width Gwa, pressing of sealing rubber 3 onto upper and lower boundary portions 2F on the outer peripheral surface of body portion 2C becomes weak. When width W1 is more than 1.6 times width Gwa, the reliability against the leakage of the electrolyte when there is a flaw or a dent in the outer peripheral surface of body portion 2C is reduced.

In addition, it is preferable that groove depth d is substantially equal to or slightly less than the thickness of case 1. Furthermore, when the hardness of sealing rubber 3 is 90 (the IRHD standards), the compressed stress of sealing rubber 3 is concentrated on sealing reactive force portion 3C, so that a more reliably sealed state can be held.

Meanwhile, end 21A may be directly joined to the inner bottom surface of case 1, and end 21B may be directly joined to flange portion 2D, without using current collecting plates 7A and 7B. In this case, it is preferable that a joining portion projected toward an inner surface is provided on each of the bottom surface of case 1 and terminal plate 2 in order to make the joining easy and reliably. Then, in the joining portion, capacitor element 10 and case 1 can be joined mechanically and electrically from the outside by laser welding means, for example, as well as capacitor element 10 and terminal plate 2. However, it is preferable that current collecting plates 7A and 7B are joined to capacitor element 10. Whether or not there is a failure in a joined state of current collecting plates 7A and 7B can be examined and checked sufficiently. In addition, when current collecting plates 7A and 7B are joined to case 1, the joining operation can be easily performed. Thereby, joining reliability can be improved significantly.

Industrial Applicability

As described above, the capacitor according to the present invention has superior reliability in leakage resistance of the electrolyte. Therefore, it is applicable to electronic equipment and can be used for wide application including automobiles.

The invention claimed is:
1. A capacitor comprising:
   a capacitor element including a first electrode, a second electrode, and a separator interposed between the first electrode and the second electrode to prevent contact of the first electrode with the second electrode;
   an electrolyte impregnated in the capacitor element;
   a cylindrical case made of metal, having a bottom, accommodating the capacitor element and the electrolyte, and being connected to the first electrode;
   a metal terminal plate having a body portion and a flange portion projected from an outer peripheral surface of the body portion toward the case, and being connected to the second electrode; and a sealing rubber abutted onto the flange portion of the terminal plate, and interposed between the outer peripheral surface of the body portion of the terminal plate and a side surface of the case for sealing the case, wherein the case has a drawn and grooved portion formed by being drawn and thus grooved from an outside of the side surface at a place so that the sealing rubber can be compressed between the outer peripheral surface of the body portion of the terminal plate and the case, wherein a groove having a ring shape is provided on the outer peripheral surface of the body portion of the terminal plate at a portion, which is padded with the sealing rubber, the sealing rubber being projected into the groove, wherein a width of the groove is smaller than that of the drawn and grooved portion.

2. The capacitor according to claim 1, wherein
the sealing rubber is compressed to form a sealing reactive force portion, and a centerline of the groove is shifted from a centerline in a width direction of the drawn and grooved portion so that the sealing reactive force portion is pressed onto one of upper and lower boundary portions between the groove and the outer peripheral surface of the body portion of the terminal plate.

3. The capacitor according to claim 2, wherein
extension of the centerline in the width direction of the drawn and grooved portion is within a range of the width of the groove.

4. The capacitor according to claim 1, wherein
the upper and lower boundary portions between the groove and the outer peripheral surface of the body portion of the terminal plate have a curved surface projected into the groove.

5. A capacitor comprising:
a capacitor element including an electrolyte impregnated therein;
a cylindrical case made of metal and including a bottom portion for accommodating the capacitor element, the bottom portion connected to an electrode of the capacitor element;
a metal terminal plate connected to another electrode of the capacitor element; and
a sealing rubber abutted onto a portion of the terminal plate, and interposed between a body portion of the terminal plate and a side surface of the case for sealing the case,
wherein the case has a drawn and grooved portion configured to compress the sealing rubber between the outer peripheral surface of the body portion of the terminal plate and the case,
wherein a groove having a ring shape is provided on the outer peripheral surface of the body portion of the terminal plate, wherein the sealing rubber is projected into the ring-shaped groove,
wherein a width of the groove is smaller than that of the drawn and grooved portion.

* * * * *